March 19, 1968  G. L. CONGDON  3,373,975
BLENDER AND BUILT-IN SPATULA
Filed March 15, 1966  2 Sheets-Sheet 1
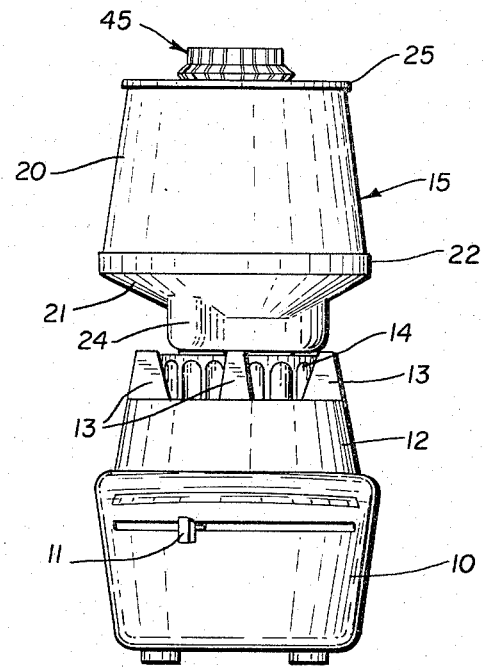
Fig_1
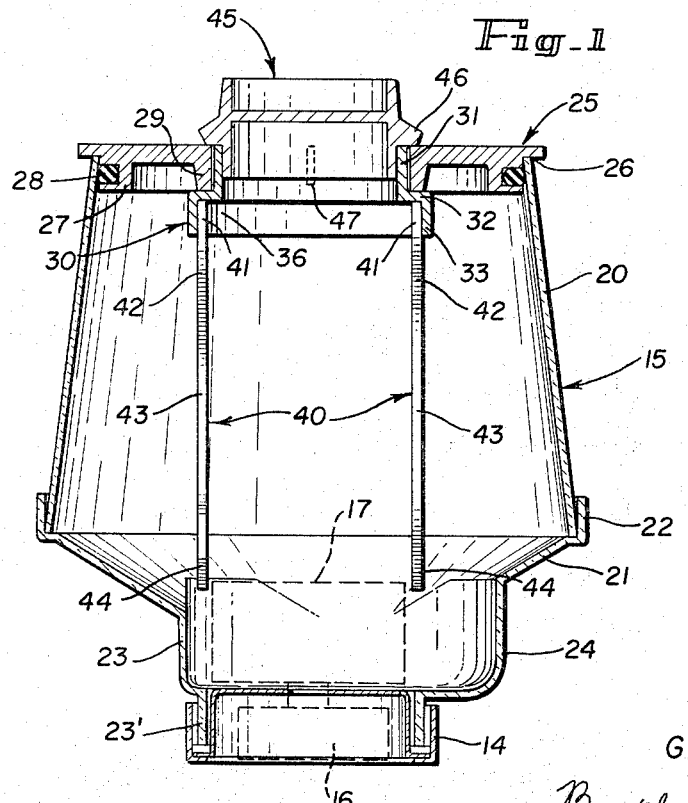
Fig_2
INVENTOR
GEORGE L. CONGDON
BY
Bertha L. MacGregor
ATTORNEY March 19, 1968

G. L. CONGDON 3,373,975

BLENDER AND BUILT-IN SPATULA

Filed March 15, 1966

INVENTOR
GEORGE L. CONGDON
BY
Bertha L. MacGregor
ATTORNEY

United States Patent Office 3,373,975
Patented Mar. 19, 1968

3,373,975
BLENDER AND BUILT-IN SPATULA
George L. Congdon, Fort Atkinson, Wis., assignor to Scovill Manufacturing Company, New Haven, Conn., a corporation of Connecticut
Filed Mar. 15, 1966, Ser. No. 534,358
7 Claims. (Cl. 259—120)

ABSTRACT OF THE DISCLOSURE

A power operated blender provided with a built-in spatula for removing ingredients from the blender container wall and directing them toward the agitator-cutter of the blender without interruption of blender operation, comprising an open top ingredient container having a reduced diameter lower portion, an agitator-cutter unit located in the said portion, a removable cover provided with a central opening closing the top of the container, a knob rotatable in the cover opening, and a spatula detachably connected to and rotatable with the knob while the blender is in operation and the cover is in place. The knob is removable from the spatula and cover to permit adding ingredients through the cover opening while the blender is in operation. The spatula includes a hub and two blades attached to the hub in parallel transversely spaced apart relationship, said blades each having an edge portion slightly spaced from the inner surface of the container side wall and an inwardly directed portion terminating adjacent the agitator-cutter of the blender in said reduced diameter portion of the container.

---

This invention relates to a blender provided with a built-in spatula.

The main object of the invention is to provide a spatula in a blender for removing material from the blender container walls and directing the material into the path of rotation of the agitator-cutter unit of the blender. Heretofore it has been necessary for the user of a blender to interrupt the operation of the motor, to remove the cover from the container, and to use a conventional spatula for removing material from the container walls and mixing the contents. The built-in spatula of my invention permits hazard-free blending of ingredients in the blender container while the motor is in operation and the container is covered.

Another object of the invention is to provide a spatula comprising a pair of blades shaped to cooperate with the container walls to produce efficient removal of the material adhering to the container, followed by feeding of the material into the path of rotation of the agitator-cutter of the blender.

Another object of the invention is to provide means for manually rotating the spatula in either direction while the motor is in operation and without removal of the container cover, whereby the blending operation continues uninterruptedly and the entire contents of the container become uniformly mixed.

Another object of the invention is to provide a knob and spatula constructed and mounted so that the knob may be removed from an opening in the cover to permit addition of ingredients, and serves also as the means for rotating the spatula.

Another object of the invention is to assemble the container, cover, knob and spatula in such manner that the parts are retained in desired relationship during operation of the blender but permit easy disassembly for cleaning purposes.

The provision of a built-in spatula permits the use of an internally smooth walled container which is easily cleaned, and eliminates the need to use a ribbed wall container such as known in the prior art.

The construction herein shown and described produces complete and uniform blinding of all ingredients, in shorter preparation time, and with complete safety to the user, whereas prior art blenders require insertion of a spatula into the container, and for sake of safety the motor operation must be interrupted to avoid inadvertent injurious contact between the spatula and the agitatior-cutter unit.

Other objects and advantages will be apparent from the drawings and following description.

In the drawings:

FIG. 1 is an elevational end view of a blender embodying my invention, including the motor enclosing base and the mixing container mounted thereon.

FIG. 2 is a transverse vertical sectional view of the mixing container, cover and spatula, in the plane of the line 2—2 of FIG. 4, showing the spatula blades in elevation.

Figure 3:
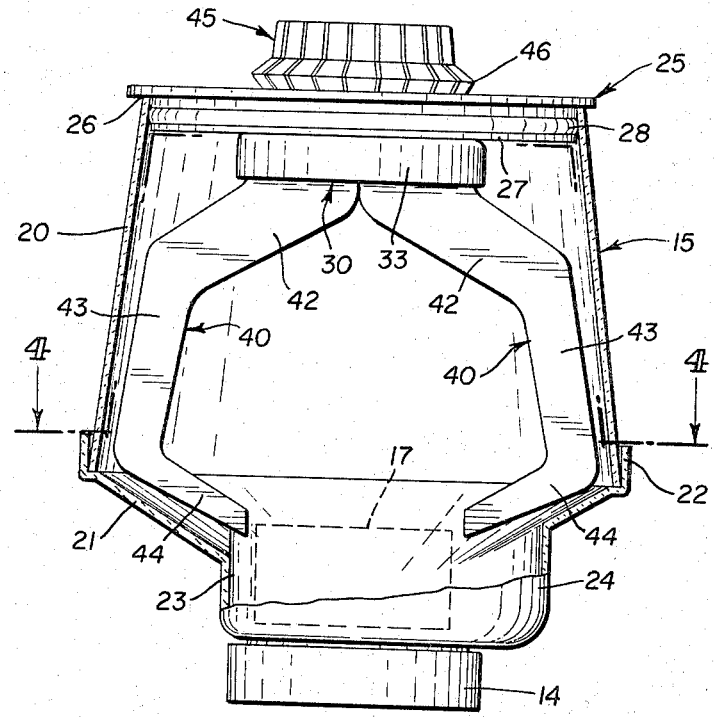
FIG. 3 is a view similar to FIG. 2, but in the plane of the line 3—3 of FIG. 4.

In the preferred embodiment of the invention shown in the drawings, 10 indicates a motor enclosing housing, 11 a speed control knob, 12 mixing container support, and 13 a plurality of guide fingers for engaging the removable bottom 14 of the container 15. The removable bottom 14 of the container may be grooved as shown in FIG. 1 or plain as shown in FIG. 3. Such removable bottom closures 14 are well known in the blender art, usually consisting of a threaded nut, agitator-cutter bearing assembly and gasket. In FIGS. 2 and 3 the motor shaft coupling 16 and agitator-cutter unit 17 are shown diagrammatically.

Figure 4:
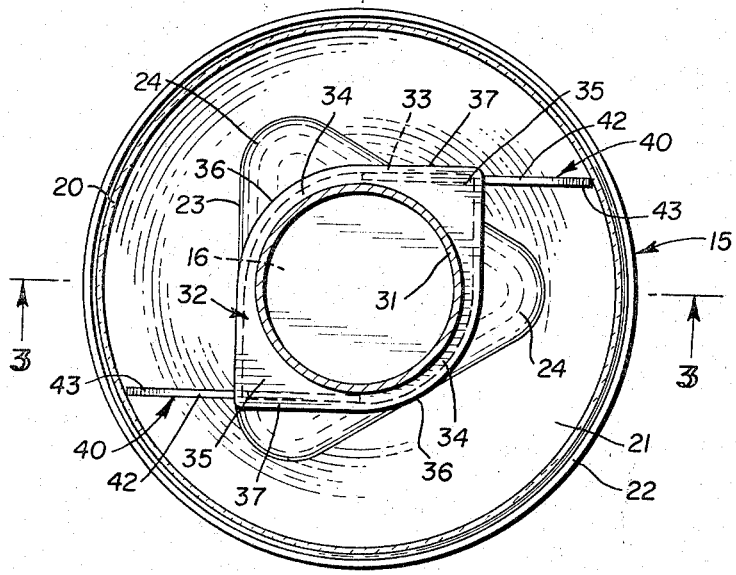
FIG. 4 is a horizontal sectional view in the plane of the line 4—4 of FIG. 3.

The mixing container 15 is shown as comprising an upper member 20 and lower member 21, the latter having a circumferential flange 22 on which the upper member is seated. However, the container 15 may be formed integrally. The part 23 of the lower member is generally triangular in horizontal cross section as shown in FIG. 4, the three straight sides being joined by curved walls 24. The lower member 23 of the container slopes downwardly into a concentric neck portion 23′. The container part 20 is generally cylindrical in form, with side walls inclined slightly downwardly and outwardly.

The open top of the container 15 is closed by a cover 25 having a circumferential edge 26 which overhangs and seats on the upper edge of the part 20 of the container. A depending flanged rib 27 provides a circumferential recess in which is supported an O-ring gasket 28 located between the rib 27 and upper wall of the container. An inwardly located annular depending rib 29 on the cover 25 defines a central circular opening in the cover.

A spatula assembly comprises a hub 30 which has an upper collar 31, horizontal ledge 32 and downturned vertical flange 33. As best shown in FIG. 4, the collar 31 is circular, the ledge 32 extends horizontally and radially from the collar 31 a short distance in the oppositely located areas 34 and a gradually greater distance in the oppositely located areas 35 between said areas 34. Thus the depending vertical flange 33 has curved walls 36 adjacent the ledge areas 34, and two straight walls 37 parallel to each other adjacent the ledge areas 35. The straight walls 37 of the hub 30 provide means for connecting thereto a pair of blades indicated as a whole at 40. The collar 31 of the hub fits frictionally in the central opening in the cover against the rib 29.

Each blade 40 is flat and thin as shown in edge elevation in FIG. 2, and provided with a hub engaging upper portion 41, downwardly and outwardly extending portion 42, slightly outwardly and downwardly directed portion 43, and downwardly and inwardly directed terminal member 44 which terminates adjacent to the agitator-cutter unit 17.

The blades 40 are parallel to each other, but spaced apart transversely, extending in opopsite directions toward the container side walls 20, and in opposite directions inwardly at 44 as shown in FIG. 3. The blades 40 may be permanently connected to the hub 30. The assembly is removable from the cover 25 for cleansing. The form of the blades is related to the interior contour of the container 15 to serve efficiently as a spatula for removing ingredients from the container walls and for conveying container contents from the side walls toward the path of rotation of the agitator-cutter unit.

A rotatable knob 45 fits into the collar 31 of the hub 30 and has an annular flange 46 which seats on the upper edge of the hub and one the upper surface of the cover 25 as shown in FIG. 2. Preferably the knob 45 has a tapered friction fit with the inside of the hub 30, and a drive key 47 prevents slippage between the knob and hub when the knob is turned manually for rotating the spatula assembly in the container. Removal of the knob 45 permits adding ingredients to the container while the blender is in operation and the cover in place.

Certain obvious changes may be made in the construction shown. For example, the blades 40 and hub 30 may be made in one piece instead of having the blades fixed to the hub. Also, the blade and hub assembly may be connected to the cover, but this arrangement is not as convenient for cleaning of the parts. Obviously a single blade may be used but is less efficient than the symmetrically formed and balanced two blade spatula. The container 15 need not be made in two parts, but the shape of the container is related to the function of the spatula blades as shown. Variation in the shape of both blades and container is permitted. The container neck may be threaded for engagement with the removable bottom closure 14, but the container bottom may be closed and have the agitator-cutter unit mounted in the container instead of in the removable bottom closure 14. In the embodiment shown, the spatula is rotated by manual rotation of the knob 45, but it is within the scope of this invention to provide power driven means for rotating the spatula unit, either a power take-off arrangement from the cutter-driving motor or a separate motor operatively connected to the unit (not shown).

In describing the invention, reference has been made to a particular example embodying the same but it is to be understood that the invention is not limited to the construction shown and that various changes may be made in the construction and general arrangement of parts without departing from the invention defined by the appended claims.

I claim:

1. A power operated blender provided with a spatula for removing ingredients from the blender container walls and directing them toward the agitator-cutter of the blender container without interruption of blender operation, comprising
    (a) an open top container,
    (b) an agitator-cutter in the container,
    (c) a removable cover provided with a central opening for closing the top of the container,
    (d) a knob rotatable in the cover opening, and
    (e) a spatula in the container beneath the cover detachably connected to and rotatable with the knob while the blender is in operation and the cover in place, said knob being detachable from the spatula and removable from the cover opening to permit addition of ingredients into the container while the blender is in operation.

2. The blender defined by claim 1, in which the container has a main body portion and a reduced-diameter lower portion, and the agitator-cutter is located in said lower portion.

3. The blender defined by claim 2, in which the spatula has a pair of blades parallel to each other and spaced apart transversely, each blade having an edge portion slightly spaced from the inner surface of the container and an inwardly directed portion which terminates adjacent the agitator-cutter in the said lower portion of the container.

4. The blender defined by claim 1, in which the spatula comprises a hub and a pair of blades, said hub consisting of a collar, a radially extending ledge and a downturned flange on the edge of the ledge, said flange having spaced apart straight portions to which the blades are rigidly connected.

5. The blender defined by claim 4, which includes key means between the spatula hub and knob for preventing slippage between the knob and spatula when the knob is rotated.

6. The blender defined by claim 1, in which the spatula includes a hub and a blade connected to the hub, and the knob has a friction fit in the hub.

7. The blender defined by claim 1, in which the spatula includes a hub and a blade connected to the hub, the hub being frictionally retained in the central opening in the cover, and the knob having a peripheral flange which bears on the cover and on the upper edge of the hub.

References Cited
UNITED STATES PATENTS

| | | | |
|---|---|---|---|
| 1,051,222 | 1/1913 | Hamilton | 259—120 |
| 1,437,567 | 12/1932 | Stewart. | |
| 2,931,320 | 4/1960 | Bandel | 259—9 X |
| 3,122,357 | 2/1964 | Roch | 259—116 |
| 3,240,435 | 3/1966 | Otto | 259—116 X |

WALTER A. SCHEEL, *Primary Examiner.*

J. M. BELL, *Assistant Examiner.*

UNITED STATES PATENT OFFICE
CERTIFICATE OF CORRECTION

Patent No. 3,373,975  March 19, 1968

George L. Congdon

It is certified that error appears in the above identified patent and that said Letters Patent are hereby corrected as shown below:

In the heading to the printed specification, line 4, "New Haven, Conn." should read -- Waterbury, Conn.

Signed and sealed this 9th day of September 1969.

(SEAL)

Attest:

Edward M. Fletcher, Jr.

Attesting Officer

WILLIAM E. SCHUYLER, JR.

Commissioner of Patents